(12) United States Patent
Tanaka et al.

(10) Patent No.: US 7,978,409 B2
(45) Date of Patent: Jul. 12, 2011

(54) HARD COAT LAYER-FORMING COMPOSITION AND OPTICAL LENS

(75) Inventors: Hirokazu Tanaka, Kitakyushu (JP); Eiko Tanaka, legal representative, Kitakyushu (JP); Sachio Murai, Nagoya (JP); Hideki Ito, Nagoya (JP); Yoshifumi Miyano, Kitakyushu (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 525 days.

(21) Appl. No.: 12/090,602

(22) PCT Filed: Oct. 17, 2006

(86) PCT No.: PCT/JP2006/320618
§ 371 (c)(1),
(2), (4) Date: Apr. 17, 2008

(87) PCT Pub. No.: WO2007/046357
PCT Pub. Date: Apr. 26, 2007

(65) Prior Publication Data
US 2010/0058955 A1    Mar. 11, 2010

(30) Foreign Application Priority Data
Oct. 18, 2005 (JP) .................. 2005-303322

(51) Int. Cl.
*G02B 1/10* (2006.01)
*G02B 1/11* (2006.01)

(52) U.S. Cl. ... 359/581; 359/513; 427/164; 106/287.11; 106/287.13; 106/287.14; 106/287.16

(58) Field of Classification Search ............. 106/287.13–287.16; 359/513, 359/581; 427/164
See application file for complete search history.

(56) References Cited

U.S. PATENT DOCUMENTS
2008/0268253 A1* 10/2008 Murai et al. ............. 428/412

FOREIGN PATENT DOCUMENTS
| EP | 1785458 | 5/2007 |
| JP | 7166131 | 6/1995 |
| JP | 8048940 | 2/1996 |
| JP | 2000204301 | 7/2000 |
| JP | 2002363442 | 12/2002 |
| JP | 2003264806 | 9/2003 |
| JP | 2005281430 | 10/2005 |
| WO | 2006025499 | 3/2006 |

OTHER PUBLICATIONS

Marchner et al, "Inhibition of acetaldehyde dehydrogenase . . . " Acta Pharmacologica et Toxicologica, vol. 39 (3) pp. 341-343 (Sep. 1976) Abstract Only.*
Fuchigami et al, "Facile synthesis . . . ", J. Org. Chem. 1983, 48, pp. 3340-3341 (1983, no month avail.).*
Kwon et al., "Acyl, N-protected alpha-aminoacyl, and peptidyl . . . ", J. Med. Chem. 1986, 29, 1922-1929, (1986, no month available).*

* cited by examiner

*Primary Examiner* — David M Brunsman
(74) *Attorney, Agent, or Firm* — The Webb Law Firm

(57) ABSTRACT

The hard coat layer-forming composition of this invention includes (A) composite oxide fine particles with a mean particle diameter of 1 to 200 nm, containing titanium, tin and optionally silicon, and with a rutile-type crystal structure, (B) an organosilicon compound represented by the formula $R^1_a R^2_b Si(OR^3)_{4-(a+b)}$ and/or a hydrolyzate thereof, and (C) a cyanamide derivative compound. A hard coat layer formed from the composition not only is excellent in transparency, scratch resistance, adhesion property, weathering resistance, impact resistance, etc. but also can enjoy no coloration or little coloration, particularly in bluing or yellowing, upon exposure to or irradiation with ultraviolet rays, even if an antireflection film is provided.

12 Claims, No Drawings

HARD COAT LAYER-FORMING COMPOSITION AND OPTICAL LENS

TECHNICAL FIELD

The present invention relates to a hard coat layer-forming composition and an optical lens. More particularly, this invention relates to a composition for forming a cured coating film (i.e. hard coat layer) which is formed by applying the composition onto an optical article as a base material, particularly a plastic lens as a base material (hereinafter referred to as "plastic lens base material" or "the base material" simply) with a transparency, and curing it and which is excellent in adhesion property, scratch resistance, dyeing property, weathering resistance, light resistance, etc., and also relates to an optical lens having a hard coat layer formed from the composition, such as a spectacle lens.

BACKGROUND ART

As materials of optical lenses, particularly spectacle lenses, plastic base materials have been frequently used instead of inorganic glass base materials in recent years. The reason is that not only the plastic base materials are excellent in properties such as lightweight property, impact resistance, processability and dyeing property but also improvement and development of the materials as plastic lenses of the second generation have been made to promote further lightening and increase of refractive index. These plastic base materials, however, have a disadvantage that they are liable to be scratched as compared with the inorganic glass base materials.

In order to avoid this disadvantage, the surface of an optical lens using the plastic base material is usually provided with a silicon-based coating film, that is, a hard coat layer. In the case of using a plastic lens base material having a high refractive index, metal oxide fine particles are further incorporated into the hard coat layer to adjust the refractive index of the hard coat layer to or near to the refractive index of the plastic lens base material, so as to avoid interference of light (which appears as interference fringes) that occurs between the plastic lens base material and the hard coat layer.

For example, in a patent document 1, it is disclosed to use, as the metal oxide fine particles, composite oxide fine particles containing titanium oxide, zirconium oxide and antimony pentaoxide. Although a hard coat layer formed by the use of a coating composition containing these fine particles is improved in the refractive index of the coating film, it exhibits insufficient adhesion property in the weathering resistance test.

In a patent document 2, also the present inventors have proposed to use, as the metal oxide fine particles, composite oxide fine particles comprising titanium, silicon, and zirconium and/or aluminum. Although a hard coat layer formed by the use of a coating composition containing these fine particles exhibits a high refractive index and is improved also in the adhesion property in the weathering resistance test, there is yet room for further improvement in the adhesion property.

In a patent document 3, the present inventors have proposed to use, as the metal oxide particles, composite oxide fine particles each of which comprises a composite solid solution oxide (i.e. core particle) comprising a composite oxide of titanium and tin with a rutile-type crystal structure and having a surface coated on the core particle with a composite oxide (i.e. coating layer) of silicon and zirconium and/or aluminum. A hard coat layer formed by the use of a coating composition containing these fine particles exhibits a high refractive index and has excellent properties of weathering resistance, light resistance, scratch resistance, impact resistance, adhesion property and the like, but in the case where an antireflection film is formed on a plastic lens base material with the hard coat layer, there is yet room for improvement from the viewpoint of preventing coloration into blue (i.e. bluing) in an atmosphere of exposure to ultraviolet rays.

In a patent document 4, the present inventors have proposed to use metal oxide fine particles each of which comprises a titanium oxide-containing core particle and a coating layer composed of antimony oxide. A hard coat layer formed by the use of a coating composition containing these fine particles exhibits a high refractive index and has excellent properties of weathering resistance, light resistance, scratch resistance, impact resistance, adhesion property and the like, but in the case where an antireflection film is formed on a plastic lens base material with the hard coat layer, there is yet room for improvement from the viewpoint of preventing coloration into yellow (i.e. yellowing) in an atmosphere of exposure to ultraviolet rays.

Patent document 1: Japanese Patent Laid-Open Publication No. 264806/2003
Patent document 2: Japanese Patent No. 3203142
Patent document 3: Japanese Patent Laid-Open Publication No. 204301/2000
Patent document 4: Japanese Patent Laid-Open Publication No 363442/2002

DISCLOSURE OF THE INVENTION

Problem to be Solved by the Invention

The present invention has been made in the light of such problems associated with the prior art as mentioned above, and it is an object of this invention to provide a composition favorable for forming a hard coat layer which not only is excellent in transparency, scratch resistance, adhesion property, weathering resistance, impact resistance, etc. but also can enjoy no coloration or little coloration of the hard coat layer with a transparency, particularly in bluing or yellowing, upon exposure to or irradiation with ultraviolet rays, even if it is provided with an antireflection film formed on the surface of the hard coat layer by a dry process.

It is another object of this invention to provide an optical lens which not only is excellent in transparency, scratch resistance, adhesion property, weathering resistance, impact resistance, etc. but also can enjoy no coloration or little coloration of a hard coat layer with a transparency, particularly in bluing or yellowing, upon exposure to or irradiation with ultraviolet rays, even if it is provided with an antireflection film formed on the surface of the hard coat layer by a dry process.

Means to Solve the Problem

As a result of earnest studies, the present inventors have found that the above problems can be solved by using a specific hard coat layer-forming composition containing a cyanamide derivative compound, and they have accomplished the present invention.

The hard coat layer-forming composition of the present invention comprises:
(A) composite oxide fine particles with a mean particle diameter of 1 to 200 nm, containing titanium, tin and optionally silicon, and with a rutile-type crystal structure, (B) an organosilicon compound represented by the following formula (I) and/or a hydrolyzate thereof,

$$R^1{}_aR^2{}_bSi(OR^3)_{4-(a+b)} \quad (I)$$

wherein $R^1$ is an alkyl group having 1 to 6 carbon atoms, an organic group having 8 or less carbon atoms containing a vinyl group, an organic group having 8 or less carbon atoms containing an epoxy group, an organic group having 8 or less carbon atoms containing a methacryloxy group, an organic group having 1 to 5 carbon atoms containing a mercapto group, or an organic group having 1 to 5 carbon atoms containing an amino group, $R^2$ is an alkyl group having 1 to 3 carbon atoms, a cycloalkyl group having 3 carbon atoms or a halogenated alkyl group having 1 to 3 carbon atoms, or an allyl group, $R^3$ is an alkyl group having 1 to 4 carbon atoms or a cycloalkyl group having 3 to 4 carbon atoms, a is 0 or 1, and b is 0, 1 or 2, and (C) a cyanamide derivative compound.

The composite oxide fine particles (A) are preferably those coated with a composite oxide containing silicon and zirconium and/or aluminum.

The cyanamide derivative compound is preferably one or more compounds selected from the group consisting of guanidine, a guanidine organic acid, a guanidine inorganic acid salt, an alkylguanidine, aminoguanidine and dicyandiamide.

The hard coat layer-forming composition of this invention preferably further comprises an uncrosslinked epoxy compound.

The hard coat layer-forming composition of this invention preferably further comprises, as a curing agent, one or more compounds selected from the group consisting of an organic carboxylic acid and an acetylacetone metal chelate compound.

The optical lens of the present invention is an optical lens comprising a plastic lens base material and a hard coat layer provided on the plastic lens base material, wherein the hard coat layer is formed from a hard coat layer-forming composition comprising:

(A) composite oxide fine particles with a mean particle diameter of 1 to 200 nm, containing titanium, tin and optionally silicon, and with a rutile-type crystal structure, (B) an organosilicon compound represented by the following formula (I) and/or a hydrolyzate thereof,

$$R^1{}_aR^2{}_bSi(OR^3)_{4-(a+b)} \quad (I)$$

wherein $R^1$ is an alkyl group having 1 to 6 carbon atoms, an organic group having 8 or less carbon atoms containing a vinyl group, an organic group having 8 or less carbon atoms containing an epoxy group, an organic group having 8 or less carbon atoms containing a methacryloxy group, an organic group having 1 to 5 carbon atoms containing a mercapto group, or an organic group having 1 to 5 carbon atoms containing an amino group, $R^2$ is an alkyl group having 1 to 3 carbon atoms, a cycloalkyl group having 3 carbon atoms or a halogenated alkyl group having 1 to 3 carbon atoms, or an allyl group, $R^3$ is an alkyl group having 1 to 4 carbon atoms or a cycloalkyl group having 3 to 4 carbon atoms, a is 0 or 1, and b is 0, 1 or 2, and (C) a cyanamide derivative compound.

That is to say, the hard coat layer provided in the optical lens of this invention is formed from the hard coat layer-forming composition of this invention.

The hard coat layer preferably has a refractive index of not less than 1.52.

On an upper side surface of the hard coat layer, an antireflection film is preferably formed.

Between the plastic lens base material and the hard coat layer, a primer layer is preferably formed.

The primer layer is preferably formed from a coating composition containing a mixture of a polyurethane resin or a polyester resin, and metal oxide fine particles, or a composite polymer obtained by reacting them.

The metal oxide fine particles are preferably composite oxide fine particles with a mean particle diameter of 1 to 200 nm, containing titanium, tin and optionally silicon, and with a rutile-type crystal structure.

The cured coating film of the present invention is obtained by curing a coating film comprising the above-mentioned hard coat layer-forming composition of this invention.

EFFECT OF THE INVENTION

According to the hard coat layer-forming composition of this invention, a cured coating film, namely, hard coat layer, which has high transparency and is excellent in scratch resistance, weathering resistance, chemical resistance, hot water resistance, etc., can be formed on a plastic lens base material. The hard coat layer thus formed is excellent in adhesion not only to a plastic lens base material and an antireflection film but also to a primer layer that is sometimes formed between the plastic lens base material and the hard coat layer.

Further, the hard coat layer formed from the hard coat layer-forming composition of this invention can be effectively inhibited from coloration into blue or yellow (i.e. bluing or yellowing) upon exposure to or irradiation with ultraviolet rays, even if the upper side surface of the hard coat layer is provided with an antireflection film.

According to the present invention, therefore, an optical lens meeting with the requirement of the recent plastic lens industry for no coloration or little coloration, particularly in bluing or yellowing, can be provided easily.

BEST MODE FOR CARRYING OUT THE INVENTION

The hard coat layer-forming composition and the optical lens of this invention are described in more detail hereinafter.

Hard Coat Layer-forming Composition

The hard coat layer-forming composition (also referred to as a "composition" simply, or also referred to as a "coating composition" when a solvent is contained) of this invention is a composition for forming a hard coat layer provided on a plastic lens base material and comprises (A) composite oxide fine particles, (B) an organosilicon compound and/or a hydrolyzate thereof, and (C) a cyanamide derivative compound.

In the present invention, the direction in which the hard coat layer is present against the plastic lens base material is referred to as "upper" for convenience.

(A) Composite Oxide Fine Particles

The composite oxide fine particles (A) for use in this invention are those with a mean particle diameter of 1 to 200 nm, containing titanium, tin and optionally silicon, and with a rutile-type crystal structure.

The composite oxide fine particles (A) can be prepared by such a publicly known process as described in the specification of Japanese Patent No. 2783417 (see the 1st line on the right section in Page 2 to the 22nd line on the right section in Page 3).

The mean particle diameter indicates a value measured by a laser Doppler method, and more specifically indicates a value determined by adding an ammonia-containing distilled water to an aqueous sol of the composite oxide fine particles (A) to adjust pH of the sol to 9.0, then introducing the resulting liquid into a quartz cell having a length of 1 cm, a width of 1 cm and a height of 5 cm and performing measurement using NICOMP™380 manufactured by Particle Sizing Systems Inc.

Since the composite oxide fine particle (A) is with a rutile-type crystal structure, photo-catalysis activity of the composite oxide fine particle (A) itself can be lowered.

If titanium and tin constituting the composite oxide fine particle (A) are represented in terms of $TiO_2$ and $SnO_2$ respectively, the weight ratio of $TiO_2$ to $SnO_2$ ($TiO_2/SnO_2$) is desired to be in the range of 1/9.9 to 14/1, preferably 1/5 to 10/1.

When the weight ratio ($TiO_2/SnO_2$) is in the above range, the composite oxide fine particle (A) has a high refractive index. In addition, by the use of the composite oxide fine particles (A) with a rutile-type structure of high crystallizability, a hard coat layer-forming composition applicable for a plastic lens base material with a high refractive index can be obtained.

If the weight ratio ($TiO_2/SnO_2$) is less than 1/9.9, a hard coat layer having a sufficiently high refractive index cannot be formed occasionally. If the weight ratio ($TiO_2/SnO_2$) is more than 14/1, a composite oxide fine particle with a rutile-type crystal structure is not obtained easily, and mixed crystal type composite oxide fine particles with anatase-type and rutile-type crystal structures are liable to be formed.

In the case where the composite oxide fine particle (A) contains silicon, if titanium, tin and silicon constituting the composite oxide fine particle (A) are represented in terms of $TiO_2$, $SnO_2$ and $SiO_2$ respectively, the weight ratio of ($TiO_2+SnO_2$) to $SiO_2$ (($TiO_2+SnO_2$)/$SiO_2$) is desired to be in the range of 95/5 to 75/25, preferably 90/10 to 80/20.

If the weight ratio (($TiO_2+SnO_2$)/$SiO_2$) is less than 75/25, a hard coat layer having a sufficiently high refractive index cannot be formed occasionally. If the weight ratio (($_{TiO2}$+$SnO_2$)/$SiO_2$) is more than 95/5, the titanium content in the composite oxide fine particles (A) is increased, and hence, stability of the particles in the dispersion liquid is deteriorated.

From the viewpoint of production of an optical lens having excellent light resistance and weathering resistance, the composite oxide fine particles (A) are preferably those coated with a composite oxide containing silicon and zirconium and/or aluminum. That is to say, it is preferable that the composite oxide fine particle (A) consists of a core particle (i.e. core) and a coating layer (i.e. shell) with which the core particle is coated, the core particle contains titanium, tin and optionally silicon and is a composite oxide with a rutile-type crystal structure, and the coating layer is a composite oxide containing silicon, and zirconium and/or aluminum.

The coating layer is a composite oxide containing silicon, and zirconium and/or aluminum, and is more specifically any one of:

(1) a composite oxide containing silicon and zirconium,
(2) a composite oxide containing silicon and aluminum, and
(3) a composite oxide containing silicon, zirconium and aluminum.

In the case where the coating layer is formed by the above components (1), if silicon and zirconium in the coating layer are represented in terms of $SiO_2$ and $ZrO_2$ respectively, the weight ratio of $SiO_2$ to $ZrO_2$ ($SiO_2/ZrO_2$) is desired to be in the range of 99/1 to 50/50, preferably 90/10 to 60/40.

If the weight ratio ($SiO_2/ZrO_2$) is less than 50/50, metal oxide fine particles contained in a hard coat layer-forming composition as a coating liquid are liable to be aggregated. If the weight ratio ($SiO_2/ZrO_2$) is more than 99/1, reproducibility in the formation of the coating layer may not be maintained, and consequently, it tends to become difficult to obtain a particle having a stable core-shell structure as mentioned above.

In the case where the coating layer is formed by the above components (2), if aluminum and silicon in the coating layer are represented in terms of $Al_2O_3$ and $SiO_2$ respectively, the weight ratio of $Al_2O_3$ to $SiO_2$ ($Al_2O_3/SiO_2$) is desired to be in the range of 0.01/25 to 0.20/25, preferably 0.02/25 to 0.15/25.

If the weight ratio ($Al_2O_3/SiO_2$) is less than 0.01/25, reproducibility in the formation of the coating layer may not be maintained, and consequently, it tends to become difficult to obtain a particle having a stable core-shell structure as mentioned above. If the weight ratio ($Al_2O_3/SiO_2$) is more than 0.20/25, metal oxide fine particles contained in a hard coat layer-forming composition as a coating liquid are liable to be aggregated.

In the case where the coating layer is formed by the above components (2), the contents of silicon, zirconium and aluminum in the coating layer preferably satisfy the conditions of the above components (1) and (2) at the same time. More specifically, if zirconium, aluminum and silicon are represented in terms of $ZrO_2$, $Al_2O_3$ and $SiO_2$ respectively, the weight ratio of $SiO_2$ to $ZrO_2$ ($SiO_2/ZrO_2$) is desired to be in the range of 99/1 to 50/50, preferably 90/10 to 60/40, and the weight ratio of $Al_2O_3$ to $SiO_2$ ($Al_2O_3/SiO_2$) is desired to be in the range of 0.01/25 to 0.20/25, preferably 0.02/25 to 0.15/25.

If the weight ratio of $SiO_2$ to $ZrO_2$ ($SiO_2/ZrO_2$) is less than 50/50 or the weight ratio of $Al_2O_3$ to $SiO_2$ ($Al_2O_3/SiO_2$) is more than 0.20/25, metal oxide fine particles contained in a hard coat layer-forming composition as a coating liquid are liable to be aggregated.

If the weight ratio of $SiO_2$ to $ZrO_2$ ($SiO_2/ZrO_2$) is more than 99/1 or the weight ratio of $Al_2O_3$ to $SiO_2$ ($Al_2O_3/SiO_2$) is less than 0.01/25, reproducibility in the formation of the coating layer may not be maintained, and consequently, it tends to become difficult to obtain a particle having a stable core-shell structure as mentioned above.

With regard to the core particle and the coating layer constituting the composite oxide fine particle (A), the weight ratio of the core particle to the coating layer (core particle/coating layer) is desired to be in the range of 100/0.5 to 100/200, preferably 100/1 to 100/100. If the weight ratio (core particle/coating layer) is less than 100/200, improvement of refractive index cannot be expected, and if the weight ratio (core particle/coating layer) is more than 100/0.5, stability of the composite oxide particles in the dispersion is deteriorated.

At least a part of the composite oxide constituting the core particle and/or the coating layer may have been hydrated and may have a hydroxyl group.

The mean particle diameter (mean particle diameter including core and shell in the case where the fine particle has the aforesaid core-shell structure) of the composite oxide fine particles (A) is in the range of 1 to 200 nm, preferably 1 to 100 nm. If the mean particle diameter is less than 1 nm, scratch resistance of a film (i.e. hard coat layer) formed on the plastic lens base material using the hard coat layer-forming composition of this invention tends to be lowered, or storage stability of the coating composition containing the composite oxide fine particles (A) tends to be deteriorated. If the mean particle diameter is more than 200 nm, the hard coat layer tends to become opaque, and consequently, lowering of transparency of an optical lens having the hard coat layer is sometimes induced.

Surface Treatment of Composite Oxide Fine Particles (A)

The surfaces of the composite oxide fine particles (A) (surfaces of the coating layers in the case where the fine particles have the coating layers) are desirable to be treated and modified with an organosilicon compound or an amine compound. If the surfaces of the composite oxide fine particles (A) are modified, the dispersed state of the composite oxide fine particles (A) in the hard coat layer-forming composition of this invention containing the later-described diluting solvent is stabilized over a long period of time.

As the organosilicon compound (also referred to as an "organosilicon compound (1)" hereinafter) for use in the above surface treatment, a publicly known silane-coupling agent having a hydrolyzable group is employable, and it is properly selected dependent upon the use purpose, the type of the solvent and so on. Such silane-coupling agents may be used singly or in combination of two or more kinds. Examples of the oraganosilicon compounds (1) include the following silane compounds (a) to (d).

(a) Monofunctional Silane Represented by the Formula $R_3SiX$

In the above formula, R is an organic group having an alkyl group, a phenyl group, a vinyl group, a methacryloxy group, a mercapto group, an amino group or an epoxy group, and X is a hydrolyzable group, such as an alkoxy group or a chloro group.

Typical examples of such silanes include trimethylethoxysilane, dimethylphenylethoxysilane and dimethylvinylethoxysilane.

(b) Bifunctional Silane Represented by the Formula $R_2SiX_2$

In the above formula, R and X have the same meanings as above.

Typical examples of such silanes include dimethyldiethoxysilane and diphenyldiethoxysilane.

(c) Trifunctional Silane Represented by the Formula $RSiX_3$

In the above formula, R and X have the same meanings as above.

Typical examples of such silanes include methyltriethoxysilane and phenyltriethoxysilane.

(d) Tetrafunctional Silane Represented by the Formula $SiX_4$

In the above formula, X has the same meaning as above.

Typical examples of such silanes include tetraalkoxysilanes, such as tetramethoxysilane and tetraethoxysilane.

In this surface treatment, after the organosilicon compound (1) is mixed with the composite oxide fine particles (A), the hydrolyzable groups of the organosilicon compound may be hydrolyzed, or after the hydrolyzable groups are partially hydrolyzed or hydrolyzed, the organosilicon compound (1) may be mixed with the composite oxide fine particles (A), and if necessary, the hydrolyzable groups may be further hydrolyzed.

In the stage where the operations of the surface treatment have been completed, all of the hydrolyzable groups are preferably those having reacted with —OH groups present on the surfaces of the composite oxide fine particles (A), but a part thereof may remain unreacted. For carrying out the surface treatment, it is desirable to use composite oxide fine particles (A) each having —OH group on the surface.

Examples of the amine compounds include ammonia; alkylamines, such as ethylamine, triethylamine, isopropylamine and n-propylamine; aralkylamines, such as benzylamine; alicyclic amines, such as piperidine; alkanolamines, such as monoethanolamine and triethanolamine; and quaternary ammonium salts or quaternary ammonium hydroxides, such as tetramethylammonium salt and tetramethylammonium hydroxide.

For modifying the surfaces of the composite oxide fine particles (A) with the organosilicon compound (1) or the amine compound, for example, such compound is mixed with an alcohol aqueous solution in which the composite oxide fine particles (A) are dispersed, then a catalyst is added if necessary, and thereafter the resulting mixture is allowed to stand at ordinary temperature for a given period of time or heat-treated under the given temperature conditions.

When the organosilicon compound (1) is used, the surfaces of the composite oxide fine particles (1) may be modified by adding an alcohol aqueous solution in which the composite oxide fine particles are dispersed, to an alcohol aqueous solution containing a partial hydrolyzate and/or a hydrolyzate of the organosilicon compound, and then heat-treating the resulting mixture.

In the surface treatment, the amount of the oragnosilicon compound (1) or the amine compound added is desired to be in the range of 1 to 30 parts by weight, preferably 2 to 20 parts by weight, based on 100 parts by weight of the composite oxide fine particles (A). If the amount thereof is less than 1 part by weight, effect of modifying the particle surface is not exhibited occasionally, and if the amount thereof is more than 30 parts by weight, refractive index of the resulting composite oxide fine particles (A) tends to be lowered.

In the cured coating film (i.e., hard coat layer) formed from the composition of this invention, the content (i.e. solids content) of the component derived from the composite oxide fine particles (A) is desired to be in the range of 10 to 70% by weight, preferably 15 to 60% by weight, based on 100% by weight of the cured coating film (provided that the hydrolyzable groups of the organosilicon compound and/or the hydrolyzate thereof (B) have been completely polycondensed).

If the above content is less than 10% by weight, scratch resistance of the cured coating film (i.e. hard coat layer) formed on the plastic lens base material using the hard coat layer-forming composition of this invention sometimes becomes insufficient, or a hard coat layer having a high refractive index cannot be formed occasionally. If the above content is more than 70% by weight, adhesion between the hard coat layer and the plastic lens base material is sometimes lowered, or cracks sometimes occur in the coating film when the film is cured.

(B) Organosilicon Compound and/or Hydrolyzate Thereof

The hard coat layer-forming composition of this invention contains an organosilicon compound represented by the following formula (I) and/or a hydrolyzate thereof.

$$R^1_a R^2_b Si(OR^3)_{4-(a+b)} \quad (I)$$

In the formula (I), $R^1$ is an alkyl group having 1 to 6 carbon atoms, an organic group having 8 or less carbon atoms containing a vinyl group, an organic group having 8 or less carbon atoms containing an epoxy group, an organic group having 8 or less carbon atoms containing a methacryloxy group, an organic group having 1 to 5 carbon atoms containing a mercapto group, or an organic group having 1 to 5 carbon atoms containing an amino group, R² is an alkyl group having 1 to 3 carbon atoms, a cycloalkyl group having 3 carbon atoms or a halogenated alkyl group having 1 to 3 carbon atoms, or an allyl group, R³ is an alkyl group having 1 to 4 carbon atoms or a cycloalkyl group having 3 to 4 carbon atoms, a is 0 or 1, and b is 0, 1 or 2.

A typical example of the organosilicon compound represented by the formula (I) (also referred to as an "organosilicon compound (2)" hereinafter) is an alkoxysilane compound. Examples of the alkoxysilane compounds include tetraethoxysilane, methyltrimethoxysilane, vinyltrimethoxysilane, γ-methacryloxypropyltrimethoxysilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane and N-β(aminoethyl)-γ-aminopropylmethyldiethoxysilane. Of these, tetraethoxysilane, methyltrimethoxysilane, γ-glycidoxypropyltrimethoxysilane, γ-glycidoxypropylmethyldiethoxysilane and β-(3,4-epoxycyclohexyl)-ethyltrimethoxysilane are preferable. These organosilicon compounds may be used singly or may be used in combination of two or more kinds.

In the preparation of the hard coat layer-forming composition of this invention, it is preferable that the organisilicon compound (2) is partially hydrolyzed or hydrolyzed without using a solvent or in a polar organic solvent such as an alcohol in the presence of an acid (i.e. an acidic catalyst) and water, and then mixed with the composite oxide fine particles (A). The organosilicon compound (2) may be partially hydrolyzed or hydrolyzed after it is mixed with the composite oxide fine particles (A).

In the cured coating film (i.e., hard coat layer) formed from the composition of this invention, the content (i.e. solids content) of the component derived from the organosilicon compound and/or the hydrolyzate thereof (B) is desired to be in the range of 20 to 70% by weight, preferably 30 to 60% by weight, based on 100% by weight of the cured coating film (provided that the hydrolyzable groups of the organosilicon compound and/or the hydrolyzate thereof (B) have been completely condensed).

If the above content is less than 20% by weight, adhesion between the hard coat layer formed from the composition of this invention and the plastic lens base material or the like is sometimes lowered. If the above content is more than 70% by weight, scratch resistance of the cured coating film (i.e. hard coat layer) formed on the plastic lens base material sometimes becomes insufficient, or a hard coat layer having a high refractive index cannot be formed occasionally.

(C) Cyanamide Derivative Compound

The cyanamide derivative compound (C) for use in this invention is, for example, guanidine, a guanidine organic acid, a guanidine inorganic acid salt, an alkylguanidine, aminoguanidine or dicyandiamide. Examples of the guanidine organic acids include guanidineacetic acid and guanidinepropionic acid. Examples of the guanidine inorganic acid salts include guanidine hydrochloride, guanidine nitrate and guanidine phosphate. An example of the alkylguanidine is n-dodecylguanidine. Of these, a guanidine organic acid, a guanidine inorganic acid salt or dicyandiamide is preferably used.

In the cured coating film (i.e., hard coat layer) formed from the composition of this invention, the content (i.e. solids content) of the component derived from the cyanamide derivative compound (C) is desired to be in the range of 0.1 to 20 parts by weight, preferably 0.2 to 10 parts by weight, based on 100 parts by weight of the component derived from the organosilicon compound and/or the hydrolyzate thereof (B) in the cured coating film (provided that the hydrolyzable groups of the organosilicon compound and/or the hydrolyzate thereof (B) have been completely polycondensed).

When the cyanamide derivative compound (C) is contained in such an amount, coloration of the hard coat layer formed from the composition of this invention is effectively inhibited.

If the above content is less than 0.1 parts by weight, coloration of the hard coat layer cannot be inhibited occasionally when the hard coat layer is exposed to or irradiated with ultraviolet rays. If the above content is more than 10 parts by weight, shortening of a pot life of the resulting composition (i.e. hard coat layer-forming composition) is induced, and in certain circumstances gelation may occur in such composition.

Other Components

In order to enhance dyeing property of the hard coat layer and adhesion thereof to the plastic lens base material, and further, in order to prevent occurrence of cracks, the hard coat layer-forming composition of this invention may contain an uncrosslinked epoxy compound in addition to the above components.

Examples of the uncrosslinked epoxy compounds include 1,6-hexanediol diglycidyl ether, ethylene glycol diglycidyl ether, propylene glycol diglycidyl ether, glycerol diglycidyl ether and glycerol triglycidyl ether. Of these, 1,6-hexanediol diglycidyl ether, glycerol diglycidyl ether, glycerol triglycidyl ether or the like is preferably used. These compounds may be used singly or may be used in combination of two or more kinds.

In the cured coating film (i.e., hard coat layer) formed from the composition of this invention, the content (i.e. solids content) of the component derived from the uncrosslinked epoxy compound is desired to be in the range of 1 to 20 parts by weight, preferably 2 to 10 parts by weight, based on 100 parts by weight of the component derived from the organosilicon compound and/or the hydrolyzate thereof (B) in the cured coating film (provided that the hydrolyzable groups of the organosilicon compound and/or the hydrolyzate thereof (B) have been completely polycondensed).

If the above content is less than 1 part by weight, effect of adding the uncrosslinked epoxy compound is not recognized occasionally, and if the above content is more than 20 parts by weight, scratch resistance of the coating film (i.e. hard coat layer) formed on the plastic lens base material tends to be lowered.

The composition of this invention may further contain a curing agent for accelerating curing of the composition applied onto the plastic lens base material.

Examples of the curing agents include organic carboxylic acids, such as adipic acid, itaconic acid, malic acid, trimellitic anhydride, pyromellitic anhydride and hexahydrophthalic anhydride; acetylacetone metal chelate compounds represented by the formula $M(CH_2COCH_2COCH_3)_n$ (wherein M is a metallic element, and n is a valence of the metallic element M), such as acetylacetone iron(III); metal alkoxides, such as titanium alkoxide and zirconium alkoxide; alkali metal organic carboxylates, such as sodium acetate and potassium acetate; and perchlorates, such as lithium perchlorate and magnesium perchlorate. Of these, preferable are organic carboxylic acids and acetylacetone metal chelate compounds represented by the formula $M(CH_2COCH_2COCH_3)_n$ (wherein M is a metallic element, and n is a valence of the metallic element M), and particularly preferable are adipic acid, itaconic acid and acetylacetone iron(III), from the viewpoint of adhesion between the hard coat layer and the plastic lens base material. These compounds may be used singly or may be used in combination of two or more kinds.

In the cured coating film (i.e., hard coat layer) formed from the composition of this invention, the content (i.e. solids content) of the component derived from the curing agent is desired to be in the range of 0.5 to 30 parts by weight, preferably 1 to 20 parts by weight, based on 100 parts by weight of the component derived from the organosilicon compound and/or the hydrolyzate thereof (B) in the cured coating film (provided that the hydrolyzable groups of the organosilicon compound and/or the hydrolyzate thereof (B) have been completely polycondensed).

If the above content is less than 0.5 parts by weight, a hard coat layer having sufficient hardness is not obtained occasionally, and if the above content is more than 30 parts by weight, shortening of a pot life of the resulting composition (i.e. hard coat layer-forming composition) is sometimes induced.

To the composition of this invention, a surface active agent may be added as a leveling agent, when necessary. Examples of the surface active agents include silicone-based surface active agents, such as polyoxyalkylene dimethylpolysiloxane, and fluorine-based surface active agents, such as perfluoroalkylcarboxylate and perfluoroalkylethylene oxide adduct. Of these, silicone-based surface active agents are preferable.

To the hard coat layer-forming composition of this invention, a benzophenone-based ultraviolet ray absorber, a benzotriazole-based ultraviolet ray absorber, a hindered amine-based light stabilizer or the like may be further added, when necessary.

The hard coat layer-forming composition of this invention may further contain an organic solvent or the like as a diluting solvent. Examples of the diluting solvents include water, such as distilled water and pure water; alcohols, such as methanol, ethanol and propanol; ketones, such as methyl ethyl ketone and diacetone alcohol; esters, such as ethyl acetate and butyl acetate; and cellosolves, such as ethyl cellosolve and butyl cellosolve. Of these, lower alcohols, such as methanol, and water are preferable. These solvents may be used singly or may be used as a mixture of two or more kinds.

Addition of the diluting solvent such as an organic solvent to the composition of this invention is preferable from the viewpoints that fluidity of the composition is increased and application of the composition onto the plastic lens base material is facilitated.

The content of the diluting solvent in the hard coat layer-forming composition of this invention is in the range of preferably 50 to 90% by weight, more preferably 60 to 80% by weight, based on 100% by weight of the composition of this invention.

Optical Lens

The optical lens of this invention is obtained by forming a cured coating film, namely, a hard coat layer, on the plastic lens base material using the above-described hard coat layer-forming composition of this invention.

As for the application method of the composition (i.e. coating method) to form the hard coat layer, a publicly known method such as dipping or spin coating is employable.

When a coating film composed of the hard coat layer-forming composition applied onto the plastic lens base material by such a method is thermally cured, a hard coat layer is formed. The thermal curing is carried out by heat-treating the coating film at a temperature of 80 to 130° C. for 0.5 to 5 hours. The film thickness of the cured coating film thus obtained, i.e., hard coat layer, is desired to be in the range of 1.0 to 5.0 μm, preferably 1.5 to 3.5 μm.

In the above manner, a hard coat layer having a refractive index of not less than 1.52, more particularly 1.57 to 1.75, can be formed.

It is well known that interference fringes occur unless the refractive index of the plastic lens base material and the refractive index of the hard coat layer agree with each other. By the use of the hard coat layer-forming composition of this invention, however, a hard coat layer having the above refractive index can be formed, and therefore, if a plastic lens base material having a refractive index equivalent thereto is used, interference fringes do not occur. The refractive index of the hard coat layer can be controlled by properly changing the type or the amount of the organosilicon compound (B) used in the preparation of the hard coat layer-forming composition of this invention, and/or by properly changing the amount of titanium contained in the composite oxide fine particles (A) or the like.

It is thought that in the hard coat layer formed from the hard coat layer-forming composition of this invention, the OH group on the surface of the composite oxide fine particle (A) and the $OR^3$ group of the organosilicon compound and/or the hydrolyzate thereof (B) are bonded by condensation reaction and that the organosilicon compounds and/or the hydrolyzates thereof (B) are bonded by condensation reaction of the $OR^3$ group with the $OR^3$ group.

In the optical lens of this invention, further, an antireflection film is preferably formed on the upper side surface of the hard coat layer, and if necessary, a primer layer is preferably formed between the plastic lens base material and the hard coat layer, though it depends upon the use purpose of the optical lens.

For forming the antireflection film, a publicly known process is employable. Typical examples of such processes include a dry process wherein using a metal oxide, such as $SiO_2$, $SiO$, $Ta_2O_5$, $SnO_2$, $WO_3$, $TiO_2$, $ZrO_2$ and $Al_2O_3$, a metal fluoride, such as $MgF_2$, or another inorganic substance, a film is formed on the hard coat layer by vacuum deposition, sputtering, ion plating or the like, and a wet process wherein a coating composition obtained by mixing the composite oxide fine particles (A) used in the formation of the hard coat layer with an alkoxysilane compound and/or a polyfunctional acrylate compound is applied onto the hard coat layer by dipping, spin coating or the like and then subjected to heat treatment or UV irradiation to form a film. The antireflection film may be a film of one layer, or may be a film of plural layers when necessary.

As for the coating composition for forming the primer layer, a composition containing a mixture of a resin, such as a thermosetting polyurethane resin formed from a block type polyisocyanate and a polyol and an aqueous emulsion type polyurethane resin or polyester resin, and metal oxide fine particles, or a composite thereof (reaction product of the resin and the metal oxide fine particles) can be illustrated. As for the metal oxide fine particles, publicly known fine particles of an oxide and/or a composite oxide of one or more metals selected from the group consisting of Ti, Fe, Zn, W, Sn, Ta, Zr, Sb, Nb, In, Ce, Si, Al, Y, Pb and Mo are employable. Of these, composite oxide fine particles with a mean particle diameter of 1 to 200 nm, containing titanium, tin and silicon, and with a rutile-type crystal structure are preferably used from the viewpoint of adhesion to the plastic base material.

As for the coating composition containing a composite polymer of the resin and the metal oxide fine particles, a coating composition containing, as a main component, a composite polymer obtained by reacting (1) a resin compound such as an elastomer having a carboxyl group with (2) metal oxide fine particles having an epoxy ring-containing group on the particle surface, said coating composition being described in Japanese Patent Application No. 249229/2005 and PCT/JP2006/315913 previously applied by the present applicant, is also employable.

For forming the primer layer, such a publicly known process as described in Japanese Patent Laid-Open Publication No. 35902/1995 is adaptable.

The plastic lens base material is not specifically restricted as long as the refractive index of the base material is in the range of 1.49 to 1.80, preferably 1.60 to 1.80. Examples of such plastic lens base materials include those made of a polystyrene resin, an aromatic allyl resin, a polycarbonate resin, a polythiourethane resin and a polythioepoxy resin. As for the plastic lens base materials, various plastic lens base materials that are on the market or test-supplied at present are employable.

The optical lens of this invention has characteristics that it is not colored or hardly colored into blue or yellow (i.e. bluing or yellowing) upon exposure to or irradiation with ultraviolet rays, even if an antireflection film is provided on the surface of the hard coat layer. Although the mechanism to impart such characteristics has not been made clear yet, the hard coat layer to constitute the optical lens is formed from the hard coat layer-forming composition of this invention containing the cyanamide derivative compound (C), and hence, such characteristics are exhibited.

The present invention is further described with reference to the following examples, but it should be construed that this invention is in no way limited to those examples.

Preparation of Hard Coat Layer-forming Composition

EXAMPLE 1

Preparation of Composite Oxide Fine Particle Dispersion Liquid 46.833 kg of a titanium tetrachloride aqueous solution having a concentration of 7.75% by weight in terms of $TiO_2$, which was prepared by adding pure water to titanium tetrachloride (available from Kishida Chemical Co., Ltd.), and 18.148 kg of aqueous ammonia having a concentration of 15% by weight were mixed to neutralize the titanium tetrachloride aqueous solution. Thereafter, the precipitate was washed with pure water to obtain 27.290 kg of hydrous titanic acid.

To 3.760 kg of the hydrous titanic acid, 5.715 kg of aqueous hydrogen peroxide having a concentration of 35% by weight and 29.574 kg of pure water were added, and they were heated at 80° C. for 2 hours to give a mixed solution. Thereafter, 10.95 kg of pure water was added to the mixed solution to prepare a polyperoxytitanic acid aqueous solution.

To the resulting polyperoxytitanic acid aqueous solution, 4.453 kg of an aqueous solution of potassium stannate (available from SHOWAKAKOU Co., Ltd.) having a concentration of 1.02% by weight (which contains 45.45 g of tin compound in terms of $SnO_2$) was added, and they were sufficiently stirred. Thereafter, the resulting solution was subjected to deionization treatment with a cation exchange resin (Diaion SK1BH available from Mitsubishi Chemical Corporation). After the deionization treatment, 835.5 g of a silica sol (available from catalysts & Chemicals Industries Co., ltd.) having a concentration of 16.3% by weight (which contains 136.35 g of silica in terms of $SiO_2$) was added, and 12.8 kg of pure water was further added so that the solids concentration would become 1% by weight, to prepare a mixed solution. Subsequently, the mixed solution was introduced into an autoclave having an internal volume of 100 liters, and with stirring, the mixed solution was heated at a temperature of 175° C. for 18 hours to perform hydrolysis reaction. The resulting colloidal solution was concentrated to prepare 6.575 kg of a water dispersion sol (referred to as a "preparation liquid-A" hereinafter) containing, as solids content, 10% by weight of a composite oxide of titanium, tin and silicon (also referred to as "metal oxide fine particles (1)" hereinafter).

Next, to 250.15 kg of an aqueous solution of zirconium oxychloride having a concentration of 2% by weight in terms of $ZrO_2$, which was prepared by adding 237 kg of pure water to 13.15 kg of zirconium oxychloride (available from Taiyo Koko Co., Ltd.), aqueous ammonia having a concentration of 15% by weight was added to obtain a slurry of a zirconia gel of pH 8.5. The slurry was subjected to filtration and washing to obtain a cake of a substance having a concentration of 10% by weight in terms of $ZrO_2$.

To 85 g of the resulting cake of the substance, 0.775 kg of pure water was added, and a KOH aqueous solution was further added to make the resulting liquid alkaline. Thereafter, 170 g of aqueous hydrogen peroxide (available from Kishida Chemical Co., Ltd.) having a concentration of 35% by weight was further added, and the resulting liquid was heated to dissolve the cake of the substance. Thus, 1.7 kg of a hydrogen peroxide solution of zirconium (referred to as a "preparation liquid-B" hereinafter) having a concentration of 0.5% by weight in terms of $ZrO_2$ was prepared.

Further, commercially available water glass (available from Dokai Chemical Co., Ltd.) was diluted with pure water and then dealkalized with a cation exchange resin (Diaion SK1BH available from Mitsubishi Chemical Corporation) to prepare a silicic acid solution (referred to as a "preparation liquid-C" hereinafter) having a concentration of 2% by weight in terms of $SiO_2$.

Next, to 0.5 kg of the preparation liquid-A, 2 kg of pure water was added to adjust the solids concentration to 2% by weight. Thereafter, the resulting liquid was heated to a temperature of 90° C., then to the liquid were slowly added 1.7 kg of the preparation liquid-B and 1.325 kg of the preparation liquid-C, and they were heat-treated in an autoclave at a temperature of 175° C. for 18 hours. The resulting mixed liquid was concentrated to prepare a water dispersion sol (referred to as a "preparation liquid-D" hereinafter) containing, as solids content, 20% by weight of core-shell type composite oxide fine particles (2) wherein the surfaces of the composite oxide fine particles (1) as core particles were coated with a composite oxide of silicon and zirconium.

To 300 g of the preparation liquid-D, 240 g of methanol (available from Chusei Oil Co., Ltd., the same shall apply hereinafter) was added, and they were stirred. Thereafter, 10 g of tetraethoxysilane (available from Kishida Chemical Co., Ltd.) was added as a surface treating agent, and the resulting liquid was heat-treated at a temperature of 50° C. for 24 hours. Further, water contained as a dispersion solvent was replaced with methanol, and then the resulting liquid was concentrated until the solids concentration became 20% by weight, to prepare an organosol (referred to as a "preparation liquid-E" hereinafter) containing composite oxide fine particles (3) wherein the surfaces of the composite oxide fine particles (2) were modified with tetraethoxysilane.

The mean particle diameter of the composite oxide fine particles (3) contained in the resulting preparation liquid-E was about 11 nm. When titanium, tin and silicon constituting the core portion (i.e. core) of the metal oxide fine particle (3) were represented in terms of $TiO_2$, $SnO_2$ and $SiO_2$ respectively, the weight ratio of $TiO_2$ to $SnO_2$ ($TiO_2/SnO_2$) was about 11/1, and the weight ratio of ($TiO_2+SnO_2$) to $SiO_2$ (($TiO_2+SnO_2$)/$SiO_2$) was about 8/2. When silicon and zirconium constituting the coating portion (i.e. shell) of the metal oxide fine particle (3) were represented in terms of $SiO_2$ and $ZrO_2$ respectively, the weight ratio of $SiO_2$ to $ZrO_2$ ($SiO_2$/$ZrO_2$) was about 3/1. Further, the weight ratio of the core portion to the coating portion (core/shell) in the metal oxide fine particle (3) was about 100/7.

Preparation of Film-forming Coating Composition 80 g of γ-glycidoxypropyltrimethoxysilane (TSL8350 available from GE Toshiba Silicones Co., Ltd.), 20 g of γ-glycidoxypropylmethyldiethoxysilane (TSL8355 available from GE Toshiba Silicones Co., Ltd.) and 50 g of methanol were mixed, and with stirring, 21 g of a 0.01N hydrochloric acid aqueous solution was dropwise added to the resulting solution. The resulting solution was further stirred at room temperature for 24 hours to perform hydrolysis reaction of the silane compounds.

Subsequently, to the hydrolyzed solution, 350 g of the preparation liquid-E, 50 g of pure water, 3 g of guanidine hydrochloride (available from Kishida Chemical Co., Ltd.), 2 g of acetylacetone iron(III) (available from Kishida Chemical Co., Ltd.), 5 g of 1,6-hexanediol diglycidyl ether (available from Nagase Chemical Industries Co., Ltd.) and 1.0 g of a silicone-based surface active agent ("SILWET L-7001" available from Nippon Unicar Co., Ltd.) as a leveling agent were added, and they were stirred at room temperature for 24 hours to prepare a hard coat layer-forming coating composition (hereinafter referred to as "hard coating material H1").

EXAMPLE 2

Preparation of Film-forming Coating Composition

To 100 g of γ-glycidoxypropyltrimethoxysilane (TSL8350 available from GE Toshiba Silicones Co., Ltd.), 50 g of methanol was added, and with stirring, 25 g of a 0.01N hydrochloric acid aqueous solution was dropwise added to the resulting solution. The resulting solution was further stirred at room temperature for 24 hours to perform hydrolysis reaction of the silane compound.

Subsequently, to the hydrolyzed solution, 350 g of the preparation liquid-E used in Example 1, 4 g of dicyandiamide (available from Kishida Chemical Co., Ltd.), 15 g of itaconic acid as a curing agent and 1.0 g of a silicone-based surface active agent ("SILWET L-7001" available from Nippon Unicar Co., Ltd.) as a leveling agent were added, and they were stirred at room temperature for 24 hours to prepare a hard coat layer-forming coating composition (hereinafter referred to as "hard coating material H2").

EXAMPLE 3

Preparation of Film-forming Coating Composition

To 100 g of γ-glycidoxypropyltrimethoxysilane (TSL8350 available from GE Toshiba Silicones Co., Ltd.), 50 g of methanol was added, and with stirring, 25 g of a 0.01N hydrochloric acid aqueous solution was dropwise added to the resulting solution. The resulting solution was further stirred at room temperature for 24 hours to perform hydrolysis reaction of the silane compound.

Subsequently, to the hydrolyzed solution, 160 g of the preparation liquid-E, 50 g of pure water, 3 g of guanidine hydrochloride (available from Kishida Chemical. Co., Ltd.), 2 g of acetylacetone iron(III) (available from Kishida Chemical Co., Ltd.) and 1.0 g of a silicone-based surface active agent ("SILWET L-7001" available from Nippon Unicar Co., Ltd.) as a leveling agent were added, and they were stirred at room temperature for 24 hours to prepare a hard coat layer-forming coating composition (hereinafter referred to as "hard coating material H3").

COMPARATIVE EXAMPLE 1

Preparation of Film-forming Coating Composition 80 g of γ-glycidoxypropyltrimethoxysilane (TSL8350 available from GE Toshiba Silicones Co., Ltd.), 20 g of γ-glycidoxypropylmethyldiethoxysilane (TSL8355 available from GE Toshiba Silicones Co., Ltd.) and 50 g of methanol were mixed, and with stirring, 21 g of a 0.01N hydrochloric acid aqueous solution was dropwise added to the resulting solution. The resulting solution was further stirred at room temperature for 24 hours to perform hydrolysis reaction of the silane compounds.

Subsequently, to the hydrolyzed solution, 350 g of the preparation liquid-E, 2.0 g of acetylacetone iron(III) (available from Kishida Chemical Co., Ltd.), 5 g of 1,6-hexanediol diglycidyl ether (available from Nagase Chemical Industries Co., Ltd.) and 1.0 g of a silicone-based surface active agent ("SILWET L-7001" available from Nippon Unicar Co., Ltd.) as a leveling agent were added, and they were stirred at room temperature for 24 hours to prepare a hard coat layer-forming coating composition (hereinafter referred to as " hard coating material C1").

COMPARATIVE EXAMPLE 2

Preparation of Film-forming Coating Composition

A hard coat layer-forming coating composition (hereinafter referred to as "hard coating material C2") was prepared in the same manner as in Example 2, except that 220 g of a commercially available organosol containing composite oxide fine particles "Optolake 1130F2(A8)" (available from Catalysts & Chemicals Industries Co., Ltd.) was used as the composite oxide fine particle dispersion liquid, instead of the preparation liquid-E. Outline of the organosol, and the composite oxide fine particles contained therein are as follows.

Composite oxide fine particle: composite oxide containing titanium, iron and silicon.

$TiO_2/Fe_2O_3$=99.8/0.2 (weight ratio)

($TiO_2+Fe_2O_3$)/$SiO_2$=85.8/14.2 (weight ratio)

Crystal structure: anatase type

Surface modification treating agent: tetraethoxysilane

Mean particle diameter: 10 μm

Solids concentration of the organosol: 30% by weight

Dispersion medium of the organosol: methanol

COMPARATIVE EXAMPLE 3

Preparation of Film-forming Coating Composition

A hard coat layer-forming coating composition (hereinafter referred to as "hard coating material C3") was prepared in the same manner as in Example 2, except that 330 g of a commercially available composite oxide fine particle-containing organosol "Queen Titanic 11-1020G" (available from Catalysts & Chemicals Industries Co., Ltd.) was used as the composite oxide fine particle dispersion, instead of the preparation liquid-E. Outline of the organosol, and the composite oxide fine particles contained therein are as follows.

Composite oxide fine particle: composite oxide containing titanium and silicon.
$TiO_2/SiO_2=85.8/14.2$ (weight ratio)
Crystal structure: anatase type
Surface modification treating agent: γ-glycidoxypropyltrimethoxysilane
Mean particle diameter: 10 μm
Solids concentration of the organosol: 20% by weight
Dispersion medium of the organosol: methanol

COMPARATIVE EXAMPLE 4

Preparation of Film-forming Coating Composition

To 100 g of γ-glycidoxypropyltrimethoxysilane (TSL8350 available from GE Toshiba Silicones Co., Ltd.), 50 g of methanol (available from Chusei Oil Co., Ltd.) was added, and with stirring, 25 g of 0.01N hydrochloric acid was dropwise added to the resulting solution. The resulting solution was further stirred at room temperature for 24 hours to perform hydrolysis reaction of the silane compound.

Subsequently, to the hydrolyzed solution, 160 g of the preparation liquid-E, 1.5 g of acetylactone aluminum (available from Kishida Chemical Co., Ltd.) as a curing agent, 15 g of itaconic acid (available from Kishida Chemical Co., Ltd.) as a curing agent, and 1.0 g of a silicone-based surface active agent ("SILWET L-7001" available from Nippon Unicar Co., Ltd.) as a leveling agent were added, and they were stirred at room temperature for 24 hours to prepare a hard coat layer-forming coating composition (hereinafter referred to as "hard coating material C4").

PREPARATION EXAMPLE

Preparation of Primer Layer-forming Coating Composition

To 122 g of a commercially available polyurethane emulsion "Superflex 420NS" (available from Dai-Ichi Kogyo Seiyaku Co., Ltd.) which is a water dispersion type urethane elastomer with a solid concentration of 32% by weight, 240 g of the preparation liquid-E containing the aforesaid composite oxide fine particles and 480 g of methanol were added, and they were stirred for 1 hour. Subsequently, 1.0 g of a silicone-based surface active agent ("SILWET L-7001" available from Nippon Unicar Co., Ltd.) as a leveling agent was added to the resulting solution, and they were stirred at room temperature for 24 hours to prepare a primer layer-forming coating composition.

Preparation of Test Samples of Plastic Lens

EXAMPLE 4

(1) Pretreatment of Plastic Lens Base Material

A necessary number of the following commercially available plastic lens base materials for the tests and evaluations were prepared.

(1) MR-8 (available from Mitsui Chemicals, Inc.) which is a monomer name, but is used herein as the name of a plastic lens base material having refractive index of 1.60, manufactured by use of such monomer.

(2) MR-7 (available from Mitsui Chemicals, Inc.) which is a monomer name, but is used herein as the name of a plastic lens base material having refractive index of 1.67, manufactured by use of such monomer.

Subsequently, the plastic lens base materials were immersed in a KOH aqueous solution having a concentration of 10% by weight at a temperature of 40° C. for 2 minutes to perform etching. Then, the plastic lens base materials were taken out, washed with water and then sufficiently dried.

(2) Formation of Primer Layer

Of the plastic lens base materials obtained as above, the surface of the example base material 1 was coated with the primer layer-forming coating composition to form a coating film. The coating with the coating composition was made by a dipping method (pulling rate: 100 mm/min).

Next, the coating film was heat-treated at a temperature of 100° C. for 8 minutes to pre-cure the coating film (i.e. primer layer).

The film thickness of the thus formed primer layer after pre-curing was approximately 0.6 μm.

(3) Formation of Hard Coat Layer

The surfaces of the plastic lens base materials were coated with the hard coat layer-forming coating compositions (i.e. the hard coating materials H1 to H3) in combinations shown in Table 1, to form coating films. The coating with these coating compositions was made by a dipping method (pulling rate: 250 mm/min).

Next, the coating films were dried at a temperature of 90° C. for 10 minutes and then heat-treated at a temperature of 110° C. for 2 hours to cure the coating films (i.e. hard coat layers). Simultaneously with the curing of the hard coat layer, post curing of the primer layer was carried out.

The film thickness of each of the thus formed hard coat layers after curing was approximately 2.4 to 2.8 μm.

(4) Formation of Antireflection Film Layer

On each of the surfaces of the cured hard coat layers (except the example base material 2), inorganic oxide components of the following constitution were deposited by vacuum deposition to form a layer of an antireflection film in which $SiO_2$ (0.06λ), $ZrO_2$ (0.15λ), $SiO_2$ (0.04λ), $ZrO_2$ (0.25λ) and $SiO_2$ (0.25λ) were laminated in this order from the hard coat layer side to the atmosphere side. The design wavelength λ was 520 nm. Thus, example base materials 1, 3 and 4 were prepared.

COMPARATIVE EXAMPLE 5

(1) Pretreatment of Plastic Lens Base Material

Pretreatment of plastic lens base materials was carried out in the same manner as in Example 4.

(2) Formation of Primer Layer

Of the plastic lens base materials obtained as above, the surface of the comparative example base material 1 was coated with the primer layer-forming coating composition in the same manner as in Example 4 to form a coating film (i.e. primer layer), and the coating film was pre-cured.

The film thickness of the thus formed primer layer after pre-curing was approximately 0.6 μm.

(3) Formation of Hard Coat Layer

Coating onto the surfaces of the plastic lens base materials and curing of the resulting coating films were carried out in the same manner as in Example 4, except that the aforesaid hard coat layer-forming coating compositions (i.e. the hard coating materials C1 to C4) were used in combinations shown in Table 2. Simultaneously with the curing of the hard coat layer, post curing of the primer layer was carried out.

The film thickness of each of the thus formed hard coat layers was approximately 2.4 to 3.0 μm.

(4) Formation of Antireflection Film Layer

On each of the surfaces of the cured hard coat layers (except the comparative example base materials 2 and 4), an antireflection film was formed in the same manner as in Example 4. Thus, comparative example base materials 1, 3, 5 and 6 shown in Table 2 were prepared.

Evaluation Tests of Plastic Lens Samples

The example base materials 1 to 4 and the comparative example base materials 1 to 6 obtained as above were tested and evaluated in the following manner. The results are set forth in Table 1 and Table 2.

Methods of Measurement and Evaluation (1) Appearance (Interference Fringe)

In a box having black inner walls, a fluorescent lamp "Mellow 5N" (available from Toshiba Lighting & Technology Corporation) which has three band white daylight fluorescent lamp was set, then the surfaces of the antireflection films of the example base materials and the comparative example base materials were allowed to reflect the light of the fluorescent lamp, and occurrence of rainbow pattern (interference fringes) due to interference of light was confirmed by visual observation. Then, the base materials were evaluated by the following criteria.

A: Interference fringes are rarely observed.
B: Interference fringes are not conspicuous.
C: Interference fringes are conspicuous.
D: Glary interference fringes are observed.

(2) Appearance (Haze)

In a box having black inner walls, a fluorescent lamp "Mellow 5N" (available from Toshiba Lighting & Technology Corporation) which has three band white daylight fluorescent lamp was set, then the example base materials and the comparative example base materials were vertically placed just under the fluorescent lamp, and transparency (degree of haze) of the base materials was confirmed by visual observation. Then, the base materials were evaluated by the following criteria.

A: There is no haze.
B: There is slight haze.
C: There is obvious haze.
D: There is conspicuous haze.

(3) Scratch Resistance Test

The surfaces of the example base materials and the comparative example base materials were hand-rubbed with Bonstar Steel Wool #0000 (available from Nihon Steel Wool Co., Ltd.), and scratching of the base materials was judged by visual observation. Then, the base materials were evaluated by the following criteria.

A: The surface is rarely scratched.
B: The surface is slightly scratched.
C: The surface is considerably scratched.
D: Most of the whole surface of the rubbed area is scratched.

(4) Adhesion Test

On the lens surfaces of the example base materials and the comparative example base materials, cuttings were made with a knife at regular intervals of 1 mm to form 100 squares each having a size of 1 $mm^2$, and a Cellophane adhesive tape was strongly pressed against each of the surfaces and then abruptly pulled in the direction of 90 degrees to the in-plane direction of the plastic lens base materials. These operations were repeated 5 times in all, and the number of unpeeled squares was counted. Then, the base materials were evaluated by the following criteria.

Good: The number of unpeeled squares is 95 or more
Bad: The number of unpeeled squares is less than 95.

(5) Hot Water Resistance Test

After the example base materials and the comparative example base materials were immersed in hot water at a temperature of 90° C. for 120 minutes, confirmation of appearance was made and the same adhesion test as above was further carried out. Then, the base materials were evaluated by the following criteria.

Good: The number of unpeeled squares is 95 or more.
Bad: The number of unpeeled squares is less than 95.

(6) Weathering Resistance Test

After the example base materials and the comparative example base materials were subjected to an exposure test using a xenon weather meter (X-75 model manufactured by Suga Test Instrument Co., Ltd.), confirmation of appearance was made and the same adhesion test as above was further carried out. For the base materials having an antireflection film, the exposure time was 200 hours, and for the base materials having no antireflection film, the exposure time was 100 hours. Then, the base materials were evaluated by the following criteria.

Good: The number of unpeeled squares is 95 or more.
Bad: The number of unpeeled squares is less than 95.

(7) Light Resistance Test

The example bases and the comparative example bases were irradiated with ultraviolet rays for 50 hours using a mercury lamp for a coloration test (H400-E manufactured by Toshiba Corporation). Confirmation of lens color by visual observation was made and measurement of YI (yellowness index) value was carried out before and after the test. The irradiation distance between the lamp and the test specimen was adjusted to 70 mm, and the output of the lamp was adjusted so that the surface temperature of the test specimen would become 45±5° C.

(8) Impact Resistance Test

A steel ball weighing 17 g was dropped from the height of 127 cm on the center of each of the example base materials and the comparative example base materials. Then, the base materials were evaluated by the following criteria.

Good: The base is not cracked.
Bad: The base is cracked.

TABLE 1

(Preparation of example base materials and results of evaluation tests)

|  |  | Example base material No. | | | |
| --- | --- | --- | --- | --- | --- |
|  |  | 1 | 2 | 3 | 4 |
| Preparation of base materials | Plastic lens base material | MR-7 | MR-7 | MR-7 | MR-8 |
|  | Refractive index of base material | 1.67 | 1.67 | 1.67 | 1.60 |
|  | Formation of primer layer | Yes | No | No | No |
|  | Hard coat forming composition | H1 | H2 | H2 | H3 |
|  | Formation of antireflection film | Yes (vapor deposition) | No | Yes (vapor deposition) | Yes (vapor deposition) |

TABLE 1-continued (Preparation of example base materials and results of evaluation tests)

| | | Example base material No. | | | |
|---|---|---|---|---|---|
| | | 1 | 2 | 3 | 4 |
| Evaluation test results | Appearance (interference fringe) | B | A | A | A |
| | Appearance (haze) | B | A | A | A |
| | scratch resistance | A | B | A | A |
| | Adhesion | good | good | good | Good |
| Hot water resistance | Appearance | — | good | — | — |
| | Adhesion | — | good | — | — |
| Weathering resistance | Appearance | good | good | good | Good |
| | Adhesion | good | good | good | Good |
| Light resistance | Change of lens color | slightly colored into blue | slightly colored into yellow | slightly colored into blue | Rarely changed |
| | ΔYI value | −0.8 | +0.7 | −0.6 | −0.2 |
| Impact resistance (presence or absence of crack of lens) | | absent | — | — | — |

TABLE 2

(Preparation of comparative example base materials and evaluation test results)

| | | Comparative Example base material No. | | | | | |
|---|---|---|---|---|---|---|---|
| | | 1 | 2 | 3 | 4 | 5 | 6 |
| Preparation of base materials | Plastic lens base material | MR-7 | MR-7 | MR-7 | MR-7 | MR-7 | MR-8 |
| | Refractive index of base material | 1.67 | 1.67 | 1.67 | 1.67 | 1.67 | 1.60 |
| | Formation of Primer layer | Yes | No | No | No | No | No |
| | Hard coat forming composition | C1 | C2 | C2 | C3 | C3 | C4 |
| | Formation of antireflection film | Yes (vapor deposition) | No | Yes (vapor deposition) | No | Yes (vapor deposition) | Yes (vapor deposition) |
| Evaluation test results | Appearance (interference fringe) | B | A | A | A | A | A |
| | Appearance (haze) | B | A | A | B | A | A |
| | Scratch resistance | A | B | A | C | B | A |
| | Adhesion | good | good | good | good | good | Bad |
| Hot water resistance | Appearance | — | good | — | good | — | — |
| | Adhesion | — | good | — | good | — | — |
| Weathering resistance | Appearance | good | cracked | good | cracked | good | Good |
| | Adhesion | good | good | good | fail | good | Good |
| Light resistance | Change of lens color | slightly colored into blue | slightly colored into yellow | slightly colored into dark brown | slightly colored into yellow | slightly colored into blue | slightly colored into blue |
| | ΔYI value | −2.3 | +1.2 | +2.2 | +1.9 | −3.6 | −1.7 |
| Impact resistance (presence or absence of crack of lens) | | absent | — | — | — | — | — |

The invention claimed is:

1. A hard coat layer-forming composition comprising:
  (A) composite oxide fine particles with a mean particle diameter of 1 to 200 nm, containing titanium, tin and optionally silicon, and with a rutile-type crystal structure,
  (B) an organosilicon compound represented by the following formula (I) and/or a hydrolyzate thereof,

$$R^1_a R^2_b Si(OR^3)_{4-(a+b)} \quad (I)$$

wherein $R^1$ is an alkyl group having 1 to 6 carbon atoms, an organic group having 8 or less carbon atoms containing a vinyl group, an organic group having 8 or less carbon atoms containing an epoxy group, an organic group having 8 or less carbon atoms containing a methacryloxy group, an organic group having 1 to 5 carbon atoms containing a mercapto group, or an organic group having 1 to 5 carbon atoms containing an amino group, $R^2$ is an alkyl group having 1 to 3 carbon atoms, a cycloalkyl group having 3 carbon atoms or a halogenated alkyl group having 1 to 3 carbon atoms, or an allyl group, $R^3$ is an alkyl group having 1 to 4 carbon atoms or a cycloalkyl group having 3 to 4 carbon atoms, a is 0 or 1, and b is 0, 1 or 2, and (C) a cyanamide derivative compound.

2. The hard coat layer-forming composition as claimed in claim 1, wherein the composite oxide fine particles (A) are those coated with a composite oxide containing silicon and zirconium and/or aluminum.

3. The hard coat layer-forming composition as claimed in claim 1, wherein the cyanamide derivative compound is one or more compounds selected from the group consisting of guanidine, a guanidine organic acid, a guanidine inorganic acid salt, an alkylguanidine, aminoguanidine and dicyandiamide.

4. The hard coat layer-forming composition as claimed in claim 1, further comprising an uncrosslinked epoxy compound.

5. The hard coat layer-forming composition as claimed in claim 1, further comprising, as a curing agent, one or more compounds selected from the group consisting of an organic carboxylic acid and an acetylacetone metal chelate compound.

6. A cured coating film obtained by curing a coating film comprising the hard coat layer-forming composition of claim 1.

7. An optical lens comprising a plastic lens base material and a hard coat layer provided on the plastic lens base material, wherein the hard coat layer is formed from a hard coat layer-forming composition comprising:
(A) composite oxide fine particles with a mean particle diameter of 1 to 200 nm, containing titanium, tin and optionally silicon, and with a rutile-type crystal structure,
(B) an organosilicon compound represented by the following formula (I) and/or a hydrolyzate thereof,

$$R^1_a R^2_b Si(OR^3)_{4-(a+b)} \quad (I)$$

wherein $R^1$ is an alkyl group having 1 to 6 carbon atoms, an organic group having 8 or less carbon atoms containing a vinyl group, an organic group having 8 or less carbon atoms containing an epoxy group, an organic group having 8 or less carbon atoms containing a methacryloxy group, an organic group having 1 to 5 carbon atoms containing a mercapto group, or an organic group having 1 to 5 carbon atoms containing an amino group, $R^2$ is an alkyl group having 1 to 3 carbon atoms, a cycloalkyl group having 3 carbon atoms or a halogenated alkyl group having 1 to 3 carbon atoms, or an allyl group, $R^3$ is an alkyl group having 1 to 4 carbon atoms or a cycloalkyl group having 3 to 4 carbon atoms, a is 0 or 1, and b is 0, 1 or 2, and (C) a cyanamide derivative compound.

8. The optical lens as claimed in claim 7, wherein the hard coat layer has a refractive index of not less than 1.52.

9. The optical lens as claimed in claim 7, wherein an antireflection film is formed on an upper side surface of the hard coat layer.

10. The optical lens as claimed in claim 7, wherein a primer layer is formed between the plastic lens base material and the hard coat layer.

11. The optical lens as claimed in claim 10, wherein the primer layer is formed from a coating composition containing a mixture of a polyurethane resin or a polyester resin, and metal oxide fine particles, or a composite polymer obtained by reacting them.

12. The optical lens as claimed in claim 11, wherein the metal oxide fine particles are composite oxide fine particles with a mean particle diameter of 1 to 200 nm, containing titanium, tin and optionally silicon, and with a rutile-type crystal structure.

* * * * *